UNITED STATES PATENT OFFICE 2,591,213

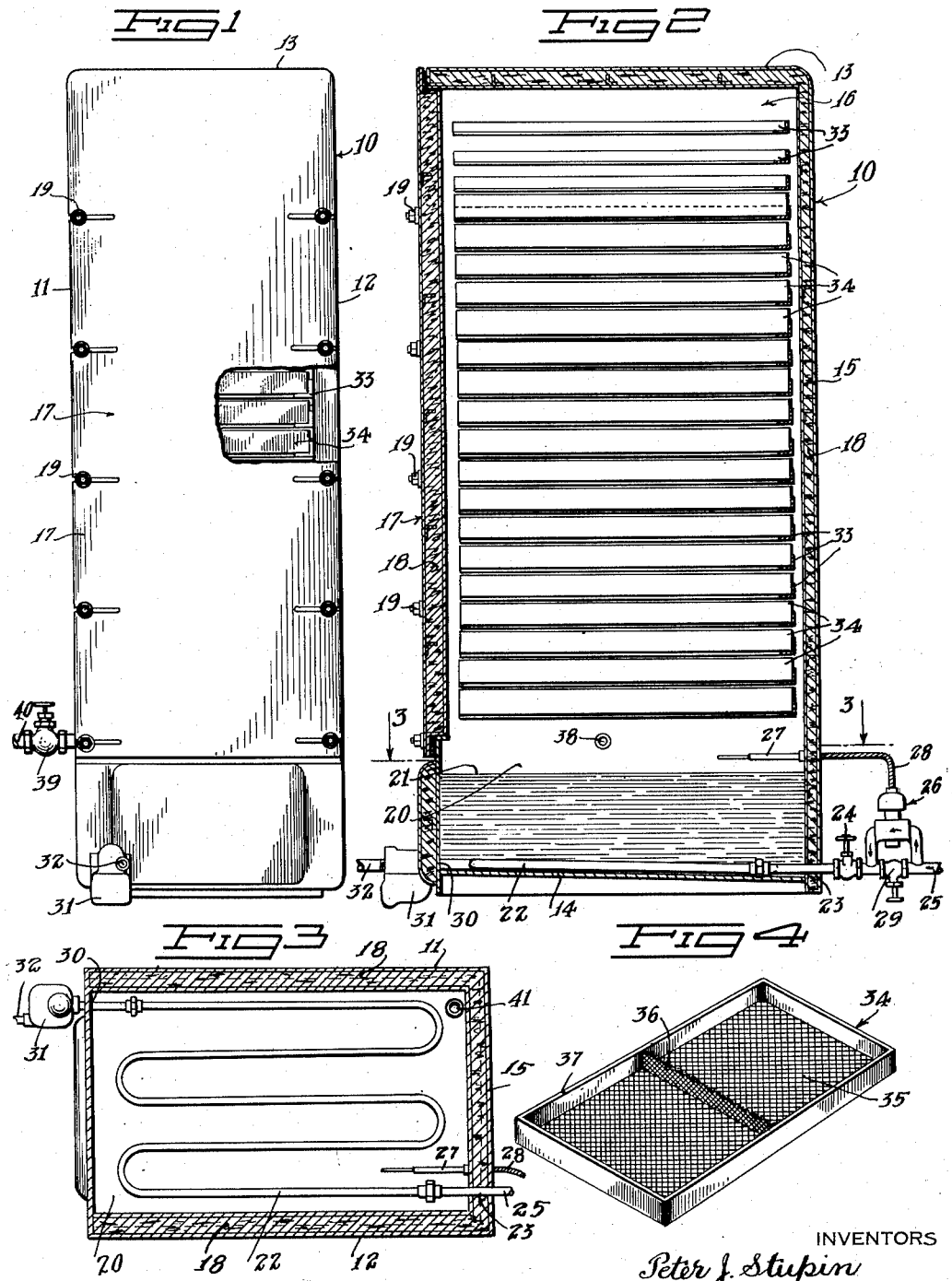

PROCESS FOR HYDRATING DATES

Peter J. Stupin, Montebello, and Loyd Adams, Maywood, Calif., assignors to Calavo, Inc., Los Angeles, Calif., a corporation of California Application July 6, 1948, Serial No. 37,198

9 Claims. (Cl. 99—100)

This invention relates to a process and apparatus for the hydration of fruits. The following description relates to the hydration of dates, but it will be understood that other dried fruits, such as figs, raisins, prunes, apricots, peaches and the like, may also be hydrated in accordance with the broader principles of our invention. Accordingly, the details of the process and apparatus will be described in connection with dates but without any limitation to that particular fruit.

Dates having a water content of about 27% or 28% may be classed as first grade fruit, according to commercial standards, and need no artificial hydration. In some growing seasons the water content of the dates may fall considerably below that figure, and therefore, in order to improve the grade of dry dates, as well as to provide a market for excessively dry dates, processes of hydration have been commonly practiced in the art. Dates having a water content under 10% may be salvaged and made commercially acceptable, whereas without hydrating such dates may not be marketable. Hydrating the fruit has the effect of tenderizing and makes the products more appetizing and palatable. Conventional practice in hydrating dates requires a long exposure to humidified atmosphere. In such conventional practice the dates are graded according to dryness and placed on trays in single layers. The trays are then placed in a rack, and the whole is moved into a steam room. Light steam is bubbled into the room through water on the floor. These rooms are not air-tight, and there is a continual loss of heat and steam. It is necessary to shift the trays continuously, for otherwise only the dates in the trays near the top will become hydrated. Experience has shown that from 8 to 36 hours is required for this conventional hydrating process.

It is known that the processing time can be reduced by raising the temperature, but higher temperatures have the undesirable effect of "caramelizing" as indicated by redness in the fleshy portion of the date. Also, rupturing and curling of the skin takes place at high temperatures. It has been determined from experience that a temperature of about 155° F. must not be exceeded if caramelizing is to be avoided.

It is the principal object of our invention to provide an improved process for hydrating dates in which the processing time can be substantially reduced, and which also results in a superior product of high uniformity.

Another object is to provide an improved form of apparatus for hydrating fruit such as dates.

Other objects and advantages will appear hereinafter.

In the drawings:

Figure 1 is a front elevation of a hydration chamber embodying the essential features of our invention.

Figure 2 is a sectional side elevation thereof.

Figure 3 is a sectional plan view taken substantially on the lines 3—3.

Figure 4 is a perspective view of one of the fruit bearing trays used in connection with the process.

Referring to the drawings, the upright shell 10 may be provided with side walls 11 and 12, a ceiling wall 13, a floor wall 14, and a rear wall 15 cooperating to define an enclosure 16. A removable cover 17 forms the front wall. We prefer to provide insulation 18 for the various walls and cover with the exception of the bottom or floor 14. Any conventional means such as, for example, bolts 19, may be provided for releasably securing the cover 17 to the shell 10.

A sump 20 is provided in the lower portion of the shell 10 and within the enclosure 16. This sump is adapted to contain a body of water having its upper level positioned as illustrated by the numeral 21. A heating coil 22 composed of a continuous pipe is positioned within the sump below the level 21. One end of this pipe extends through the shell 10 at 23 and is connected to a shut-off valve 24. A supply line 25 adapted to deliver the heating fluid, such as steam, is connected to the shut-off valve 24 via the regulating valve 26. Thermostatic control means are provided for the regulating valve 26, and as shown this means may include the thermocouple 27 positioned within the enclosure 16 above the water level 21 and connected to the regulating valve 26 by means of the electric cable 28. A by-pass valve 29 is provided for introducing steam directly from the supply pipe 25 to the coil 22 when desired. In the normal operation of the device, however, the by-pass valve 29 remains closed, and steam is supplied to the heating coil 22 through the regulating valve 26.

The outlet end of the heating coil 22 extends through the shell 10 at 30 and may be connected to a conventional form of steam trap 31 having an outlet 32.

The purpose of the heating coil 22 is to maintain the water within the sump 20 at a temperature sufficiently high to cause the water vapor to permeate the enclosure 16 and to maintain the temperature of the water vapor just under the caramelizing temperature, that is, at or below 155° F.

The side walls 11 and 12 of the shell 10 are provided with a plurality of angle clips 33 for supporting a plurality of trays in horizontal position. Such trays may take the form as illustrated in Figure 4 and generally designated 34. Each of these trays may comprise a rectangular frame having a screened bottom 35 and a central divider 36. The depth of the frame is proportioned so that approximately four layers of dates may be received without extending upwardly above the upper surface 37.

In accordance with our invention, the dates in each tray are moistened with water immediately before loading the trays 34 into the enclosure 16. The vertical spacing between adjacent trays is relatively smaller compared to the depth of the tray, so that in effect substantially the entire volume of the upper portion of the enclosure 16 is occupied by trays and dates. Each of the trays 34 is installed by sliding it horizontally toward the rear wall 15 along the supporting angle clips 33. When all of the date laden trays have been placed within the enclosure 16 the cover 17 is installed and tightened in place by means of the bolts 19. The temperature of the water within the sump 20 is maintained at about 200° F., and the water vapor rising from the surface 21 permeates the entire volume of the enclosure 16. A lateral port 38 in the side wall 11 communicates with a valve 39 exhausting to atmosphere through the outlet 40. After the cover 17 has been installed and secured the valve 39 may be opened to permit the water vapor rising in the enclosure 16 to displace atmospheric air outwardly through the port 38 and valve 39. The valve 39 is left open for a time sufficient to permit substantially the entire volume of atmospheric air to escape. This may take one-half hour, as an example. The valve is then closed and remains closed during the remainder of the hydration process. The temperature of the water vapor within the enclosure 16 is maintained just below the caramelizing temperature in order that the fruit may be hydrated as rapidly as possible without having deleterious effects on the fruit. The fruit is subjected to an even, steady temperature.

In practice we heve found that a temperature range of 152° to 155° F. gives highly satisfactory results. When this temperature is maintained the processing time varies from one and one-half hours to four hours, depending on the original moisture content of the fruit. Exceptionally dry dates may require up to six hours processing time. Very close temperature control is desirable since each additional degree Fahrenheit in temperature is effective in reducing the overall hydration time, but it is essential not to exceed the temperature at which the natural date sugars caramelize in order that the normal appearance of the fruit be preserved. The temperature of the water vapor is maintained by controlling the rate at which steam is admitted into the heating coil 22, and as shown in Figure 2 the thermocouple 27 causes the regulating valve 26 to open whenever the temperature within the enclosure 16 above the water level 21 falls below a predetermined value. When the temperature of the water vapor approaches the caramelizing temperature, the thermocouple 27 causes the regulating valve 26 to close and thus shut off the supply of steam. During hydration the pressure within the enclosure 16 may remain substantially at atmospheric pressure or may rise to about 5 p. s. i. gage pressure. By means of this process and apparatus, very high uniformity of hydration is achieved throughout the entire mass of fruit within the enclosure.

In a modified form of the process the pipe 40 may be connected to a source of vacuum pressure, and the hydrating process may be commenced with the enclosure 16 subjected to about 2½ p. s. i. gage pressure below atmospheric pressure, that is, about five inches of vacuum. The suction through the pipe 40 acts to reduce the quantity of atmospheric air within the enclosure and to supplant it with water vapor rising from the pool of hot water in the sump 20. Vapor pressure in one-half to one hour replaces the partial vacuum, and the hydrating process is normally finished at or slightly above atmospheric pressure.

A drain 41 may be provided in the bottom or floor 14 if desired for emptying the water from the sump 20. Suitable hoists or other handling equipment may be provided for manipulating the cover 17 and for handling the individual fruit laden trays 34.

The shorter periods of hydration made possible by our improved process preserve the flavor of the product to a very high degree while at the same time preventing excessive darkening of the dates. The apparatus for carrying out the process requires considerably less space than that employed in conventional practice and requires less handling of the dates, thereby reducing the overall cost of the hydration process.

Having fully described our invention, it is to be understood that we do not wish to be limited to the details herein set forth, but our invention is of the full scope of the appended claims.

We claim:

1. The method of hydrating dried fruit, comprising the steps of placing the fruit in a closed chamber, removing a major portion of atmospheric air from the chamber, and subjecting the fruit to water vapor in the temperature range of 140° F. to 155° F.

2. The method of hydrating dried fruit, comprising the steps of placing the fruit within a closed chamber, and displacing the atmospheric air within the chamber by water vapor maintained in the temperature range of 140° to 155° F.

3. The method of hydrating dried fruit, comprising the steps of placing the fruit in a closed chamber, removing a major portion of atmospheric air from the chamber, and subjecting the fruit to water vapor in the temperature range of 140° F. to 155° F. for a period of 1½ to 6 hours.

4. The method of hydrating dried fruit, comprising the steps of moistening the fruit with water, placing the fruit in a closed chamber, removing a major portion of atmospheric air from the chamber, and subjecting the fruit to water vapor in the temperature range of 140° F. to 155° F.

5. The method of hydrating dried fruit, comprising the steps of placing the fruit within a closed chamber above a heated body of water in the chamber, removing a major portion of the atmospheric air from the chamber and subjecting the fruit to water vapor maintained at 140° F. to 155° F. rising from said body of water.

6. The method of hydrating dried fruit, comprising the steps of placing the fruit within a closed chamber containing a body of hot water, displacing the atmospheric air within the chamber by water vapor issuing from said body of water, and heating the body of water to maintain the temperature of the water vapor between 140° F. and 155° F.

7. The method of hydrating dried fruit, comprising the steps of placing the fruit within a closed chamber containing a body of hot water, displacing the atmospheric air within the chamber by water vapor issuing from said body of water, and heating the body of water to maintain the temperature of the water vapor just below the caramelizing temperature for said fruit.

8. The method of hydrating dried fruit, comprising the steps of placing the fruit in a closed chamber, removing a major portion of atmospheric air from the chamber, and subjecting the fruit to water vapor in the temperature range of 140° F. to 155° F. and at subatmospheric pressure.

9. The method of hydrating dried fruit, comprising the steps of placing the fruit within a closed chamber containing a body of hot water, displacing the atmospheric air within the chamber by water vapor issuing from said body of water, and heating the body of water to maintain the temperature of the water vapor just below the caramelizing temperature for said fruit and at subatmospheric pressure.

PETER J. STUPIN.
LOYD ADAMS.

REFERENCES CITED

The following references are of record in the file of this patent:

UNITED STATES PATENTS

| Number | Name | Date |
|---|---|---|
| 883,721 | Kendall | Apr. 7, 1908 |
| 1,534,499 | Braemer | Apr. 21, 1925 |
| 1,925,210 | Smith | Sept. 5, 1933 |
| 2,128,919 | Doyle | Sept. 6, 1938 |
| 2,142,091 | Bird | Jan. 3, 1939 |
| 2,191,695 | Holzman | May 31, 1939 |
| 2,201,389 | De Give | May 21, 1940 |
| 2,286,206 | Jackson | June 16, 1942 |
| 2,363,715 | Wells | Nov. 28, 1944 |